United States Patent
Eswaran

(10) Patent No.: US 8,432,912 B2
(45) Date of Patent: Apr. 30, 2013

(54) ROUTER PACKET FILTERING AND MAPPING

(75) Inventor: Anand Eswaran, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 379 days.

(21) Appl. No.: 12/765,832

(22) Filed: Apr. 22, 2010

(65) Prior Publication Data

US 2010/0271954 A1  Oct. 28, 2010

(30) Foreign Application Priority Data

Apr. 22, 2009  (IN) .............................. 930/CHE/2009

(51) Int. Cl.
*H04L 12/28* (2006.01)
*H04L 12/56* (2006.01)
*G06F 15/173* (2006.01)

(52) U.S. Cl.
USPC ................. 370/392; 370/395.31; 709/242

(58) Field of Classification Search .................. 370/389, 370/395.31, 236, 351–356, 392, 395.32, 370/401; 709/242, 227, 232, 239
See application file for complete search history.

(56) References Cited

U.S. PATENT DOCUMENTS

| | | | |
|---|---|---|---|
| 7,668,166 B1 * | 2/2010 | Rekhter et al. | 370/392 |
| 7,783,688 B2 * | 8/2010 | Huber | 713/187 |
| 8,161,152 B2 * | 4/2012 | Ogielski et al. | 709/224 |
| 2007/0089171 A1 * | 4/2007 | Aharon et al. | 726/22 |
| 2011/0194561 A1 * | 8/2011 | Kompella | 370/392 |

FOREIGN PATENT DOCUMENTS

IN    930/CHE/2009    4/2009

* cited by examiner

*Primary Examiner* — Habte Mered

(57) ABSTRACT

A method includes determining in a router whether a test portion of a received packet matches test data specified in a filter. The test portion is specified in the filter by a first offset parameter and a first length parameter. The received packet is modified by the router replacing data in a map portion of the packet with map data specified in the filter if the test portion matches the test data. The map portion is also specified in the filter by a second offset parameter and a second length parameter.

18 Claims, 7 Drawing Sheets

ROUTER PACKET FILTERING AND MAPPING

BACKGROUND

A router is a network device having software and hardware directed to the tasks of receiving network packets and forwarding the network packets to a destination that brings them closer to their specified destinations. Routers often connect two or more subnets within a network. In wide area networks, border routers may connect two or more autonomous systems.

Most routers, in addition to forwarding network packets, are also configured to communicate directly with their neighboring routers. Such communication often includes the exchange of routing information. For example, if a router acquires or loses one or more serviceable destinations, the router may advertise this change of status to its neighboring routers to allow them to change their routing tables accordingly. In many cases, the router will use a simple update message according to a standard routing protocol (e.g., BGP, OSPF, or ISIS) to communicate this information.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As described above, network routers, in addition to providing a mechanism for network packets to travel from their sources to their specified destinations, may communicate directly with each other. For example, routers connected to separate autonomous systems may share routing information and tables with their neighbors in other autonomous systems (e.g., UPDATE packets using a protocol such as BGP). However, in certain cases, it may be desirable for routers to filter and/or modify these packets received from neighboring routers according to routing rules or other criteria specific to the recipient router.

The present specification discloses systems, methods, and computer program products directed to generic filtering and/or modifying packets received in a router from external routers.

As used in the present specification and in the appended claims, the term "packet" refers to a block of digital data formatted according to a specific protocol for transmission between electronic devices or software entities implemented by electronic devices.

As used in the present specification and in the appended claims, the term "border router" refers to a router associated with an autonomous system that is configured to communicate with at least one neighboring router associated with an external autonomous system.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems, methods, and computer program products.

Illustrative Systems

Figure 1:
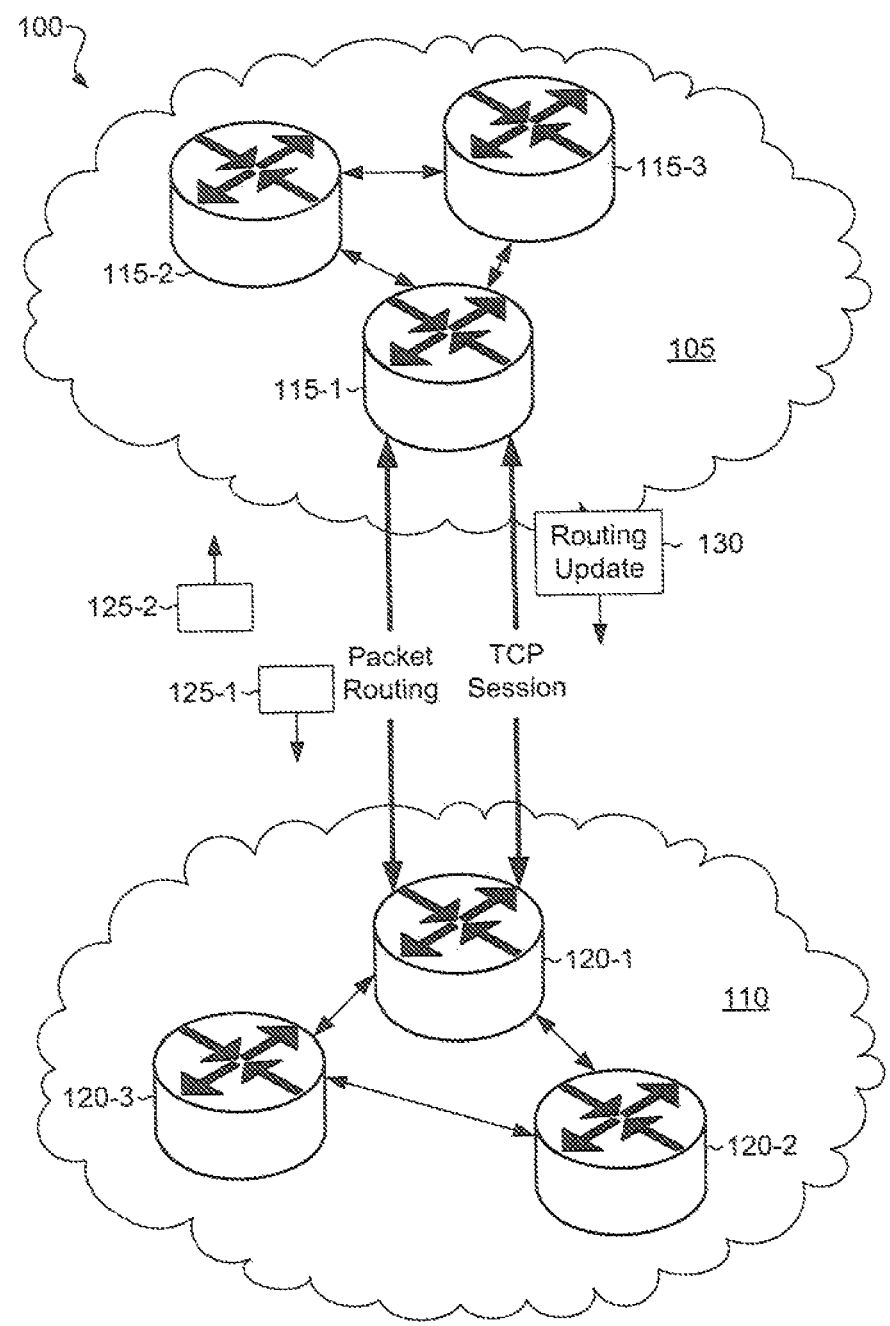
FIG. 1 is a diagram of an illustrative wide area network, according to one exemplary embodiment of the principles described herein.

FIG. 1 shows a portion of an illustrative computer wide area network (WAN) (100). The wide area network (100) may include multiple autonomous systems (105, 110). An autonomous system (105, 110) is a collection of connected internet protocol routing prefixes under the control of one or more network operators that presents a common routing policy within the wide area network (100).

Each of the autonomous systems (105, 110) may include multiple interconnected routers (115-1 to 115-3; 120-1 to 120-3). The routers (115-1 to 115-3; 120-1 to 120-3) may be configured to direct the flow of network traffic by routing packets from their sources to their destinations within the autonomous systems (105, 110). Each network device in each of the autonomous systems (105, 110) may be communicatively coupled to at least one of the routers (115-1 to 115-3; 120-1 to 120-3) corresponding to its respective autonomous system (105, 110). Additionally, each of the autonomous systems (105, 110) may have at least one border router (115-1, 120-1) configured to route packets (125-1, 125-2, 130) between the autonomous systems (105, 110).

Accordingly, a network packet may originate at a source within the first autonomous system (105) and be delivered to a destination within the first autonomous system (105) using the interconnected routers (115-1 to 115-3) in the first autonomous system (105). Additionally or alternatively, a network packet (125-1) may originate from a network device in the first autonomous system (105) and be routed from the border router (115-1) of the first autonomous system (105) to the border router (120-1) of the second autonomous system (110), which may then direct the packet to a network recipient within the second autonomous system (110).

It will be understood that while the present illustrative WAN (100) shows only two separate autonomous systems (105, 110), any number of suitable autonomous systems (105, 110) may be present in a WAN (100) consistent with the principles of the present specification. Furthermore, any number of routers (115-1, 115-2, 115-3; 120-1, 120-2, 120-3) may be used in each of the autonomous systems (105, 110), and any number of border routers (115-1, 120-1) may be present in a particular autonomous system (105, 110) as may best suit a particular application of the principles of the present specification.

Each of the border routers (115-1, 120-1) may be configured to perform multiple functions. The border routers (115-1, 120-1) may function as internal routers within their respective autonomous systems (105, 110) to route packets between internal sources and destinations. Additionally, the border routers (115-1, 120-1) may forward network packets (125-1, 125-2) to and receive network packets (125-1, 125-2) from other border routers (115-1, 120-1), thereby enabling communication between the autonomous systems (105, 110).

Communications between the border routers (115-1, 120-1) of different autonomous systems (105, 110) may be classified into at least two types. A first type of communication may include the normal routing of network packets (125-1, 125-2) between sources and destinations in different autonomous systems (105, 110).

A second type of communication between the border routers (115-1, 120-1) may include direct communications that originate from and are directed to the border routers themselves (115-1, 120-1). For example, two border routers (115-1, 120-1) may establish a transmission control protocol (TCP) session to provide each other with routing updates (130). A routing update packet (130) transmitted from a first border router (115-1) to a second border router (120-1) may alert the second border router (120-1) of new routing destinations available through the first border router (115-1) and/or withdrawn routing destinations to which the first border router (115-1) no longer will be able to forward network packets (125-1, 125-2). The recipient second border router (120-1) may use the information in the routing update (130) to update one or more routing tables it maintains.

In certain situations, a recipient border router (120-1) may be configured to disregard or modify information received in a routing update (130) prior to using the routing update (130) to update its routing table(s). Certain rules may govern how the routing update (130) is to be modified by the recipient border router (120-1). As explained in more detail below, these rules may involve the use of offset values to locate and modify certain bit sequences in a routing update packet (130) if specified filter conditions are met.

Figure 2:
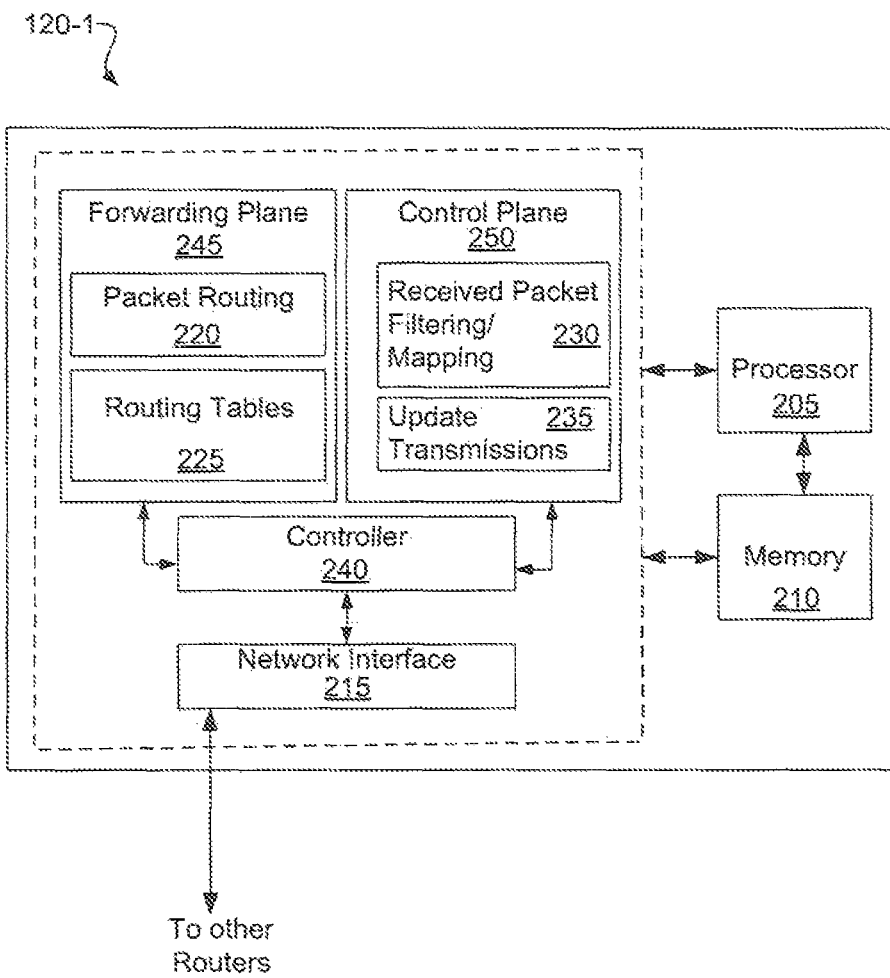
FIG. 2 is a diagram of an illustrative border router, according to one exemplary embodiment of the principles described herein.

Referring now to FIG. 2, a block diagram of an illustrative border router (120-1) is shown. The illustrative border router (120-1) may be a component of, for example, an autonomous system (105, 110, FIG. 1) of the wide area network (100, FIG. 1) shown in FIG. 1 or in any other autonomous system that may suit a particular application of the principles described herein.

The illustrative border router (120-1) may include a processor (205) and memory (210) communicatively coupled to the processor (205). The memory may be store computer readable code corresponding to one or more computer programs that, when read and executed, cause the processor (205) to perform certain tasks to achieve a desired functionality. The memory (210) may also include computer readable code configured to store data related to the computer program(s).

In this manner, the processor (205) and memory (210) of the border router (120-1) may together implement a plurality of modules (215, 220, 225, 230, 235, 240) that collectively achieve routing functionality. These modules (215, 220, 225, 230, 235, 240) may include a network interface module (215), a packet routing module (220), a routing tables module (225), a received packet filtering/mapping module (230), an update transmissions module (235), and a controller module (240). Additional and/or alternative modules may also be implemented by the processor (205) and memory (210) as may best suit a particular application of the principles described herein.

The controller module (240) implemented by the processor (205) and the memory (210) in the border router (120-1) may control the interaction of the various other modules (215, 220, 225, 230, 235) implemented in the border router (120-1).

The network interface module (215) may manage the logistics of packet transmission and receipt between the border router (120-1) and other routers within its corresponding autonomous system (110, FIG. 1) in addition to other border routers (115-1; FIG. 1) in a wide area network.

The majority of the border router's interactions may be categorized into either a forwarding plane (245) or a control plane (250). The forwarding plane (245) may be concerned principally with the immediate routing and forwarding of packets, and thus may include the packet routing module (220) and the routing tables (225) stored locally by the router (120-1).

The control plane (250) may manage communications between border routers (115-1, 120-1) that are separate from normal routing traffic handled by the forwarding plane (245). Such communications may be implemented during a TCP session between two border routers (115-1, 120-1) using, for example, one or more Border Gateway Protocol (BGP) packets. Of course, any transmission and/or gateway protocol may be used that suits a particular application of these principles. As described above, these communications between border routers (115-1, 120-1) may advertise new routes available and/or withdraw certain routes from association with certain border routers (115-1, 120-1).

The control plane (250) may include at least the received packet filtering/modification module (230) and the "update" transmissions module (235). The packet filtering/modification module (230) may use predefined criteria to filter one or more packets received from a neighboring border router and selectively modify portions of the packets that match the criteria. As discussed in relation to FIGS. 3-7 below, these criteria may be defined by an offset from a given point in a received packet, a length of a key, and the key itself. If the key matches the contents of the packet at the defined offset, changes may be made to the packet. As described below, these changes may also be defined by an offset from the given point, a length of replacement bits, and the replacement bits. If the received packets do not meet any of the predefined criteria, the filtering/modification module (230) may not modify the packets at all. The received packets from neighboring border routers (115-1), modified and unmodified, may be used to update the routing tables (225) of the router (120-1) or for any other purpose that may suit a particular application of the principles described herein.

The "update" transmission module (235) may be configured to periodically formulate and transmit update messages to neighboring border routers (115-1) that specify new routes available through the border router (120-1) and/or withdraw routes that were previously associated with the border router (120-1), thereby allowing the neighboring border routers (115-1) to update their routing tables (225).

Illustrative Filters

Figure 3:
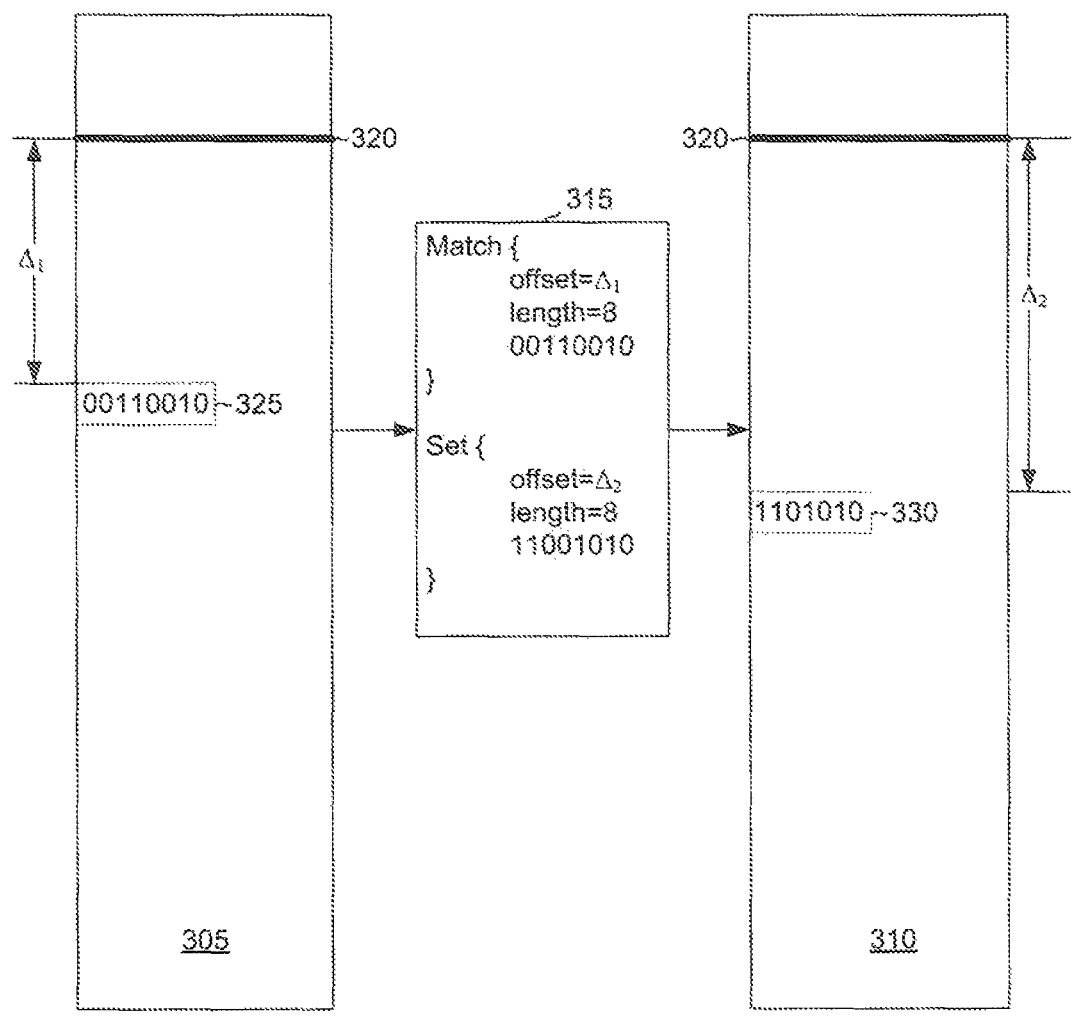
FIG. 3 is a diagram of an illustrative process of filtering and mapping data to a received packet, according to one exemplary embodiment of the principles described herein.

Referring now to FIG. 3, a diagram is shown of an illustrative packet filtering and mapping process. This process may be performed, for example, by the received packet filtering/mapping module (230, FIG. 2) of the border router (120-1, FIG. 2) shown in FIG. 2.

In the diagram, an original packet (305) and a modified packet (310) are shown. The original packet (305) represents a packet directed to a receiving border router (120-1, FIG. 1) as originally sent by a neighboring border router (115-1, FIG. 1). This original packet (305) may include updated routing rules pertaining to the sending border router (115-1, FIG. 1) for implementation by the receiving border router (120-1, FIG. 1). However, the receiving border router (120-1, FIG. 1) may have one or more routing rules that supersede one or more of the updated routing rules received from the sending border router (115-1, FIG. 1). For this reason, the receiving border router (120-1, FIG. 1) may implement at least one filter (315) to map content onto the original packet (305) such that the modified routing instructions in the modified packet (310) may be adopted by the receiving border router (120-1, FIG. 1) without conflicting with any of the superseding routing rules of the receiving border router (120-1, FIG. 1).

As shown, the filter (315) may include a "match" directive and a conditional "set" directive. In other words, if the conditions set forth in the "match" directive are met by a packet received from the sending border router (115-1, FIG. 1), the receiving border router (120-1, FIG. 1) implementing the filter (315) will modify the packet in question according to the parameters in the "set" directive.

Both the "match" directive and the "set" directive define an offset from a predetermined point of reference (320) in the packet (305), a length, and a sequence of bits. The offset and length parameters in the "match" directive define the location of a test portion (325) of the original packet (305) that is to be examined. Once found, this test portion (325) is compared to the sequence of bits defined in the "match" directive of the filter (315). If the test portion (325) of the original packet (305) matches the sequence of bits defined in the "match" directive of the filter (315), a location of the original packet (305) defined by the offset and length parameters of the "set" directive is replaced by the sequence of bits defined in the "set" directive of the filter (315).

The predetermined point of reference (320) may vary with different applications of the principles above. For example, the predetermined point of reference (320) may be the start of a layer 2 (e.g., IP/TCP) header, the start of the layer 3 (e.g., BGP) header, or even the beginning of the entire datagram. This particular choice is an implementation detail. However, packet offsets specified in a filter (315) may not exceed packet boundaries. Furthermore, when protocol allows for the fragmentation of packets (e.g., BGP UPDATE fragments), the offset is measured across fragments of the packet (e.g., determined by a "fragment offset" field specified in the IP layer). For example, if a filter (315) specifies that the 1022th byte of a packet is to be set to a value of 00000010 and the packet is fragmented into 2 fragments of size 512, the receiving border router (120-1, FIG. 1) should make sure that the second fragment's 510th byte is set to 00000010. In certain embodiments, a counter may be used to determine the correct offset specified by the filter (315).

In the present example, the "match" directive specifies an offset of $\Delta_1$, a length of 8, and a bit sequence of "00110010." Therefore, the filter (315) will cause the receiving router (120-1, FIG. 1) to first examine the 8 bits after an offset of $\Delta_1$ bits from the predetermined point of reference (320) in the original packet (305). As shown in FIG. 1, these 8 bits match the "00110010" sequence specified in the "match" directive, and hence the filter (315) will cause the receiving border router (120-1, FIG. 1) to execute the "set" directive of the filter (315).

The "set" directive of the present illustrative filter specifies a map portion (330) wherein the data from the original packet (305) is overwritten in the modified packet (310) by data mapped to that map portion (330) by the filter (315). This map portion (330) is identified in the filter (315) by an offset of $\Delta_2$, and a length of 8. Accordingly, the bit pattern "1101010" will be mapped to the first 8 bits in the modified packet (310) at a distance of $\Delta_2$ bits from the predetermined point of reference (320), thereby overwriting the data of the original packet (305).

Once the receiving border router (120-1, FIG. 1) has filtered the original packet (305) according to the filter (315), additional filters may be run on the original packet such that the modified packet (310) may potentially incur additional deviations from the data of the original packet (305). If none of the "match" conditions are met in any of the filters (315) run on the original packet (305), then the unmodified original packet (305) will be processed by the receiving border router (120-1, FIG. 1) as it is. Otherwise, the modified packet (310) will be treated by the border router (120-1, FIG. 1) as if it had been received from the sending border router (115-1) in place of the original packet (305).

The present packet filtering and modification process advantageously overcomes the limitations imposed by prior art packet filtering processes by creating a generic process that can be applied to many different situations. For example, prior art packet filtering using BGP route-map commands is typically tied to a protocol feature-set existing at the point of time in which the route-map implementation is created. However, as standards are updated, certain fields in a packet may not be understood by a particular BGP implementation. The present process is generic and not tied to any particular protocol feature-set.

Figure 4:
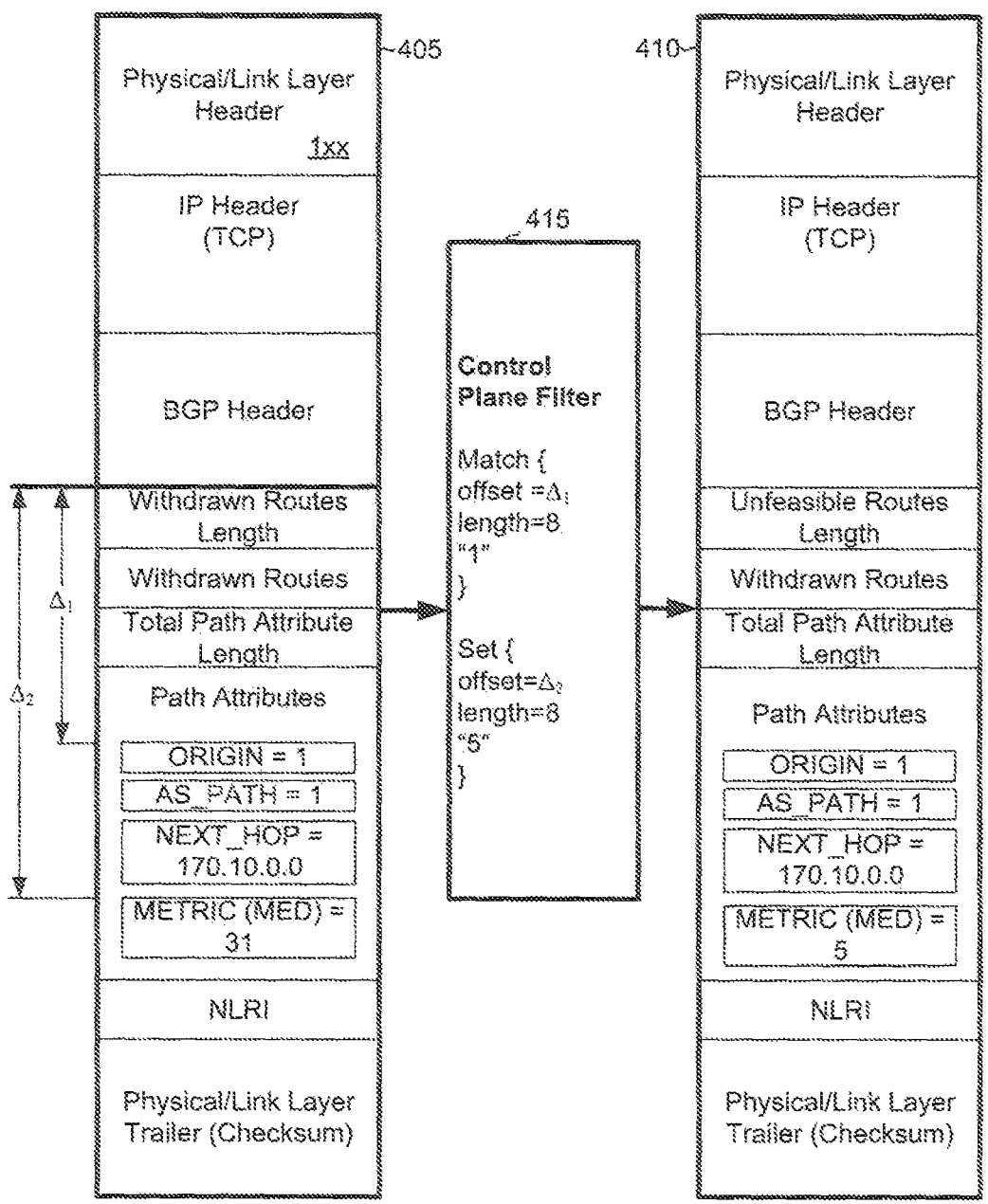
FIG. 4 is a diagram of an illustrative process of filtering and mapping data to a received packet, according to one exemplary embodiment of the principles described herein.

Referring now to FIG. 4, a diagram of an illustrative packet filtering and mapping process is shown in the more specific context of a Border Gateway Protocol (BGP) UPDATE packet transmitted from a sending border router (115-1, FIG. 1) to a receiving border router (120-1, FIG. 1) through an established Transport Control Protocol (TCP) session between the routers (115-1, 120-1, FIG. 1).

Such BGP UPDATE packets are typically nested within a larger packet that includes at least a header and a trailer for a physical/link layer and an internet protocol (IP) header for the TCP session. A BGP UPDATE packet may include, but is not limited to, a BGP header, a variable length field indicating withdrawn routes, a field indicating the length of the withdrawn routes field, a variable length field for path attributes, a field specifying the length of the path attributes field, and a Network Layer Reachability Information (NLRI) field. The path attributes field may be subdivided into fields representing different attributes of a new route being advertised by the UPDATE packet.

In the present example, an original packet (405) a modified packet (410), and a filter (415) are shown, consistent with the principles described in relation to FIG. 3. The filter (415) of the present example is configured to alter the METRIC (i.e. Multi-Exit Discriminator or "MED") attribute if the packet is from a border router (115-1, FIG. 1) associated with autonomous system 1, as specified by the AS_PATH attribute.

As shown in FIG. 4, the AS_PATH and METRIC attributes may be stored as 8 bit integers in the packets (405, 410). Accordingly, the "match" directive in the present filter (415) specifies length parameter of 8 and an offset of $\Delta_1$ that is equal to the number of bits from the predetermined point of reference (420) to the beginning of the AS_PATH attribute.

In this example, the predetermined point of reference (420) is the end of the BGP header, but any other suitable predetermined point of reference may be used.

Because the 8 bits immediately following the point specified by offset $\Delta_1$ equal "1" (i.e., 00000001), the condition specified in the "match" directive of the filter (415) has been met and the "set" directive will be carried out. The "set" directive identifies the METRIC attribute using the offset parameter $\Delta_2$ and the length parameter 8. Accordingly, the value "5" is mapped to the METRIC attribute in the modified packet (410) by writing the bits 00000101 to the 8 bits following the location specified by $\Delta_2$.

Figure 5:
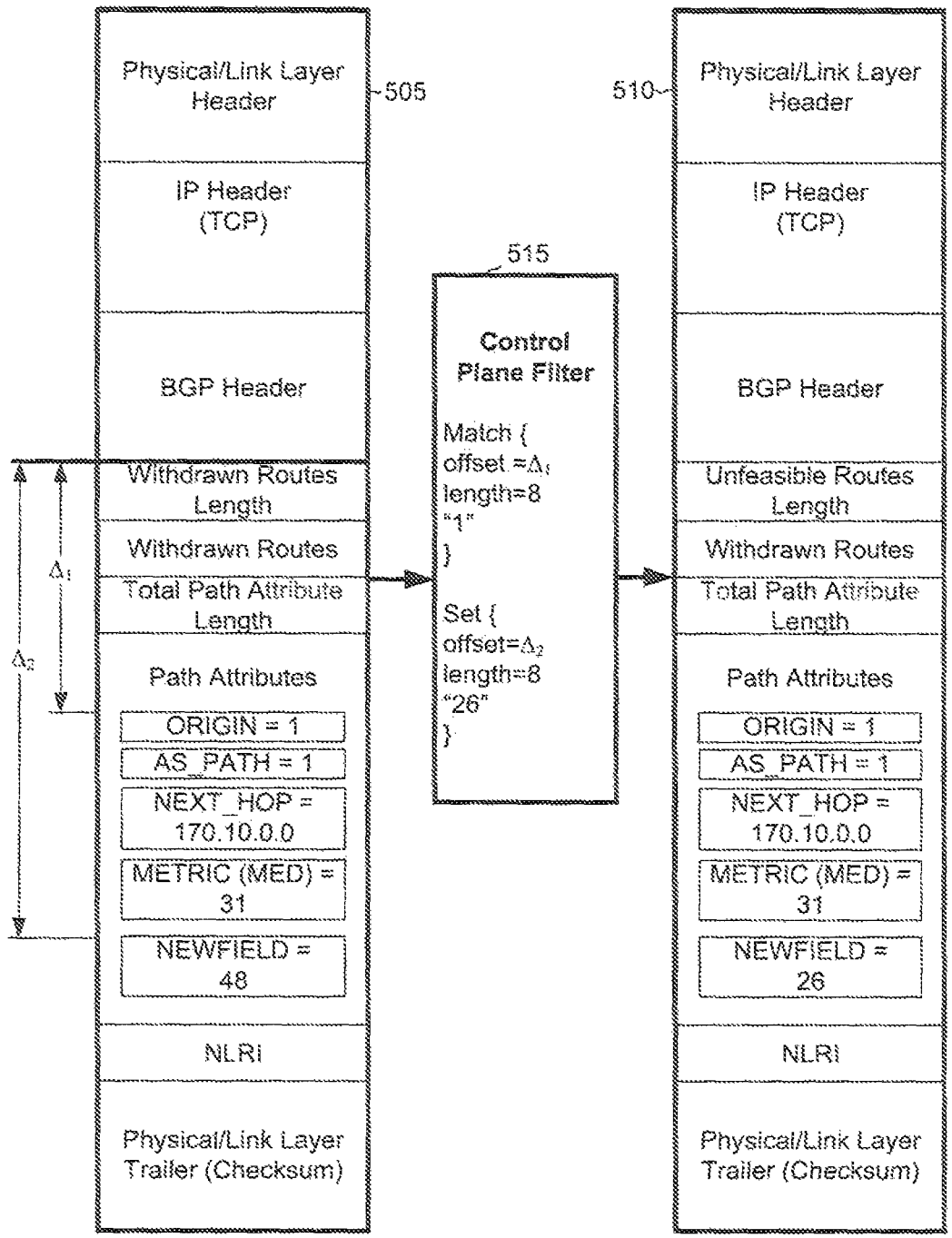
FIG. 5 is a diagram of an illustrative process of filtering and mapping data to a received packet, according to one exemplary embodiment of the principles described herein.

Referring now to FIG. 5, a diagram of another illustrative packet filtering and modification process is shown in the context of a Border Gateway Protocol (BGP) UPDATE packet transmitted from a sending border router (115-1, FIG. 1) to a receiving border router (120-1, FIG. 1) through an established Transport Control Protocol (TCP) session between the routers (115-1, 120-1, FIG. 1).

The process of the present figure is similar to that of FIGS. 3-4 in that an original packet (505) is received by a border router (120-1, FIG. 1), passed through a filter (515) associated with the receiving border router (120-1, FIG. 1), and if certain filtering criteria are met, new data is mapped to existing portions of the original packet (505) to create a modified packet (510).

In certain cases, the protocol used to transmit packets between border routers (115-1, 120-1, FIG. 1) and encode the original packet (505) may be extensible. For example, BGP is an extensible protocol, and it may be possible that an outdated BGP implementation in a receiving border router (120-1, FIG. 1) does not understand a new BGP capability (e.g., outbound community-filtering or prefix-filtering). Furthermore, because the packet received from the sending border router (115-1, FIG. 1) may be later forwarded on to additional routers from the receiving router (120-1, FIG. 1), it may be desirable to preserve data in a received packet that the receiving border router (120-1, FIG. 1) cannot itself comprehend. Moreover, it may still be desirable to implement filtering and mapping of these incomprehensible fields at the receiving border router (120-1, FIG. 1) in the interest of efficiency, such that data from the modified packet (510) may be forwarded on to other routers that may benefit from the filtering and mapping.

The generic method of filtering and mapping provided in the present specification advantageously allows for a receiving border router (120-1, FIG. 1) to filter and map new data to incomprehensible portions of a packet received from a neighboring border router (115-1, FIG. 1). This capability is illustrated in the present example of FIG. 5. As shown in FIG. 5, the original packet (505) includes a path attribute NEWFIELD that may not be recognized by the BGP implementation currently installed on the receiving border router (120-1, FIG. 1). However, because the significance of the incomprehensible attribute is irrelevant to the offset, length, and value parameters specified in both the "match" and the "set" directives of the filter (515), the receiving border router (120-1, FIG. 1) may independently map new data to the attribute if a filter condition is met. For example, as shown in FIG. 5, because the AS_PATH attribute in the original packet is equal to "1" as recited by the "match" directive of the filter (515), the NEWFIELD attribute is set to 26 in the modified packet (510) as recited by the "set" directive.

Although not shown in FIG. 5, it will be understood that the generic nature of the present packet filtering and modification process allows the process freedom to access, filter, and map new data to any portion of a received packet (505), including portions from outer network levels in the nested datagram of the packet (505).

Figure 6:
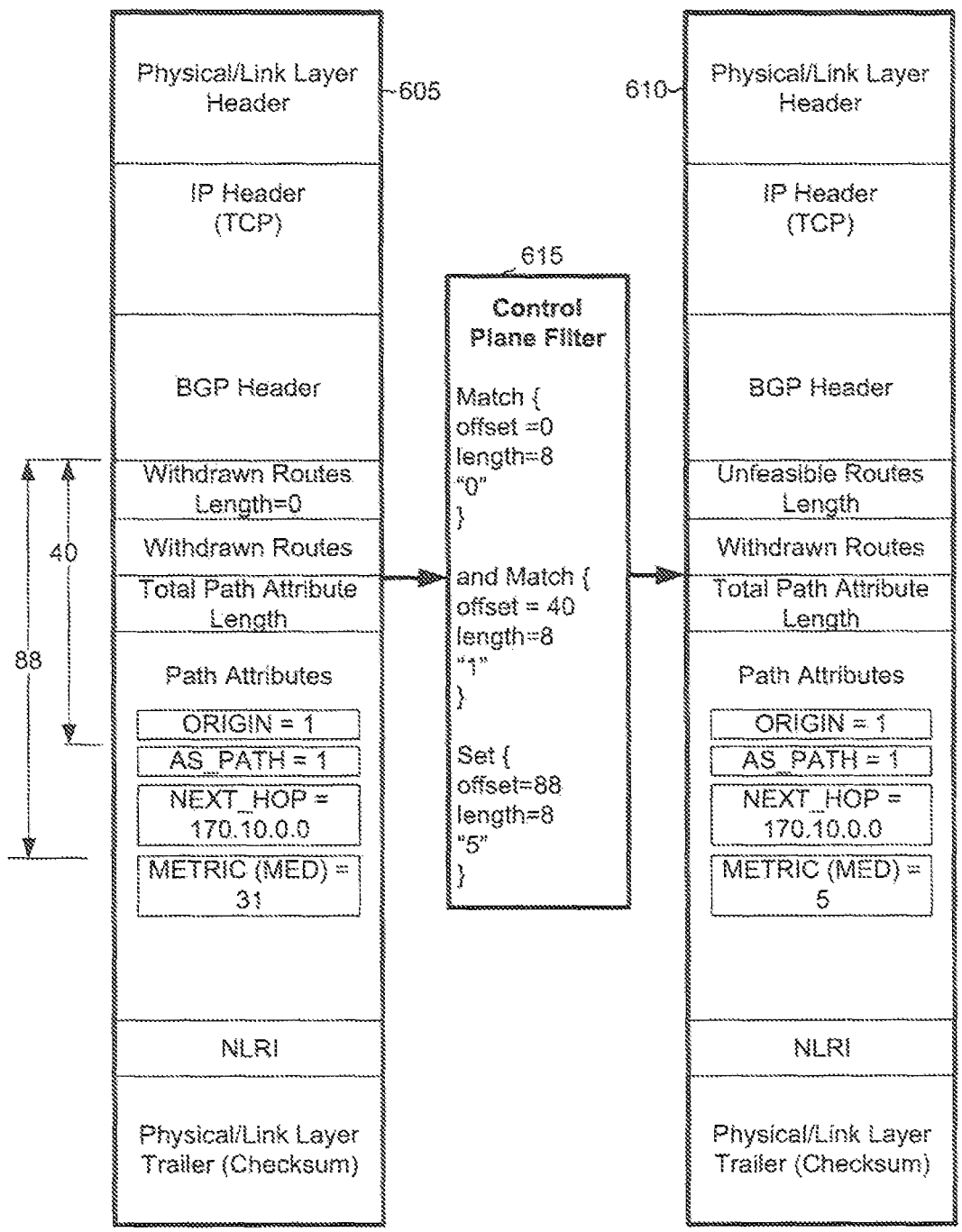
FIG. 6 is a diagram of an illustrative process of filtering and mapping data to a received packet, according to one exemplary embodiment of the principles described herein.

Referring now to FIG. 6, a diagram of another illustrative packet filtering and modification process is shown in the context of a Border Gateway Protocol (BGP) UPDATE packet transmitted from a sending border router (115-1, FIG. 1) to a receiving border router (120-1, FIG. 1) through an established Transport Control Protocol (TCP) session between the routers (115-1, 120-1, FIG. 1).

The process of the present figure is similar to that of FIGS. 3-5 in that an original packet (605) is received by a border router (120-1, FIG. 1), passed through a filter (615) associated with the receiving border router (120-1, FIG. 1), and if certain filtering criteria are met, new data is mapped to existing portions of the original packet (605) to create a modified packet (610).

The filter (615) of the present example is different from those of previous examples in that it presents two "match" directives that will be met prior to executing the "set" directive to map the new data and create the modified packet (610).

Illustrative Methods

Figure 7:
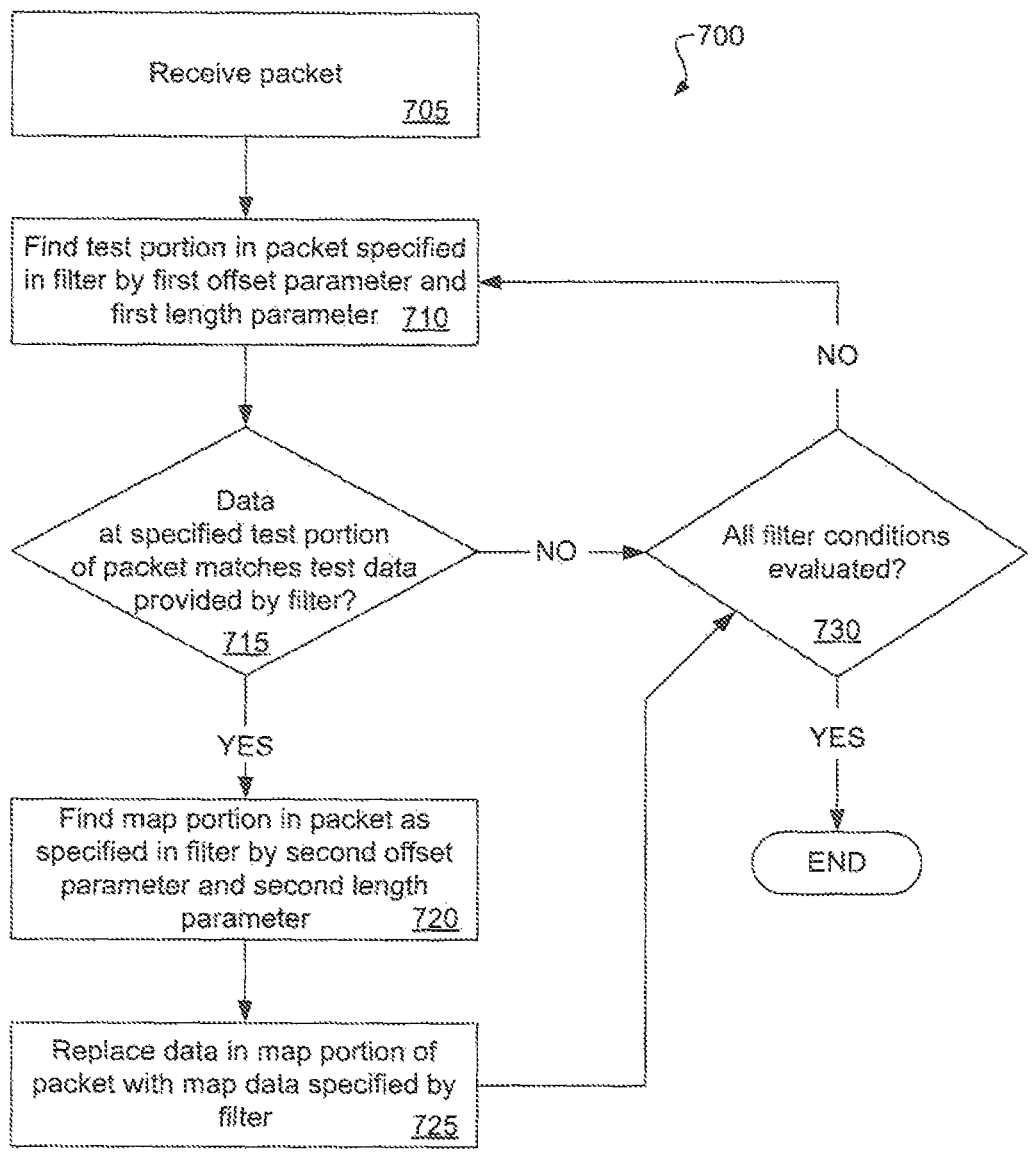
FIG. 7 is a flow diagram of an illustrative method of filtering and mapping data to a received packet, according to one exemplary embodiment of the principles described herein.

Referring now to FIG. 7, a flow diagram of an illustrative method (700) of packet filtering and mapping is shown. In some examples, the method (700) may be performed by the control plane (250) of a router (120-1, FIG. 1).

The method (700) includes receiving (step 705) a packet. The packet may, in certain embodiments, be an UPDATE or similar BGP packet transmitted through a TCP session with a neighboring border router (115-1, FIG. 1). Once the packet has been received (step 705), a test portion specified in a filter may be found (step 710) in the received packet using a first offset parameter and first length parameter in the filter. The offset parameter may be with reference to a predetermined point of reference, as explained above.

Once the test portion of the received packet has been found (step 710), an evaluation may be made as to whether (decision 715) the data stored in the received packet at the specified test portion matches test data provided by the filter. If so, a map portion of the packet may be found (step 720) using a second offset parameter and a second length parameter specified in the filter and the data in the map portion of the packet may be replaced (step 725) with map data specified by the filter.

Whether or not the data at the specified portion of the received packet matches (decision 715) the test data provided by the filter, control eventually arrives at a determination of whether (decision 730) all filter conditions have been evaluated against the received packet. For example, certain filters may include multiple alternative conditions that will be evaluated separately to determine whether the map data will be written to the received packet. Additionally or alternatively, multiple separate filters may also be evaluated against a received packet.

If all filter conditions have not been evaluated, flow returns to step 710 and blocks 710-730 are repeated with regard to the next filter condition to be evaluated. Once all filter conditions have been evaluated against the received packet, the method (700) is terminated.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method comprising:
   determining, in a router, whether a test portion of a received packet matches test data specified in a filter, said filter further comprising a first offset parameter and a first length parameter specifying the test portion; and upon a determination that said test portion matches said test data, modifying said received packet by said router replacing data in a map portion of said packet with map data specified in said filter, said filter comprising a second offset parameter and a second length parameter specifying said map portion.

2. The method of claim 1, wherein said first and second offset parameters specified in said filter are measured from a predetermined point of reference in said received packet.

3. The method of claim 1, further comprising adjusting a measured offset in said received packet to compensate for packet fragmentation.

4. The method of claim 1, wherein said received packet is an update packet transmitted from a first border router associated with a first autonomous system to a second border router associated with a second autonomous system.

5. The method of claim 4, wherein said update packet is transmitted to said second border router through an established transport control protocol session.

6. The method of claim 1, wherein said filter specifies multiple test portions, wherein each of said test portions comprises separate test data.

7. A network device, said device comprising:
a processor; and
a memory communicatively coupled to said processor;
wherein said processor is to:
receive a packet from a neighboring network device;
compare test data in a filter with data in a test portion of said packet specified by a first offset parameter and a first length parameter in said filter; and
upon a determination that said test data matches data in said test portion, write map data specified in said filter to a map portion of said packet, said map portion specified by a second offset parameter and a second length parameter in said filter.

8. The network device of claim 7, wherein said first and second offset parameters specified in said filter are measured from a predetermined point of reference in said received packet.

9. The network device of claim 7, wherein said processor is further to adjust a measured offset in said received packet to compensate for packet fragmentation.

10. The network device of claim 7, wherein said network device is a router.

11. The network device of claim 10, wherein said network device is associated with an autonomous system and said received packet is an update packet transmitted from a neighboring border router associated with a neighboring autonomous system.

12. The network device of claim 7, wherein said update packet is transmitted to said second border router through an established transport control protocol (TCP) session.

13. A non-transitory computer readable medium comprising
program code embodied therewith that when executed by a processor is to implement a method, wherein said program code is to:
determine whether a test portion of said received packet matches test data specified in a filter, said filter further comprising a first offset parameter and a first length parameter specifying the test portion; and
upon a determination that said test portion matches said test data, modify said received packet by replacing data in a map portion of said packet with map data specified in said filter, said filter comprising a second offset parameter and a second length parameter specifying said map portion.

14. The non-transitory computer readable medium of claim 13, wherein said first and second offset parameters specified in said filter are measured from a predetermined point of reference in said received packet.

15. The non-transitory computer readable medium of claim 13, wherein said filter specifies multiple test portions, wherein each of said test portions comprises separate test data.

16. The method of claim 1, wherein said received packet comprises a border Gateway Protocol (BGP) header, and said first and second offset parameters are measured from the end of the BGP header.

17. The network device of claim 7, wherein said received packet comprises a border Gateway Protocol (BGP) header, and said first and second offset parameters are measured from the end of the BGP header.

18. The non-transitory computer readable medium of claim 13, wherein said received packet comprises a border Gateway Protocol (BGP) header, and said first and second offset parameters are measured from the end of the BGP header.

* * * * *